July 25, 1961          B. E. MILLS          2,993,683
DISPENSING DEVICE FOR LIQUID PRODUCTS
Filed Feb. 6, 1956          3 Sheets-Sheet 1
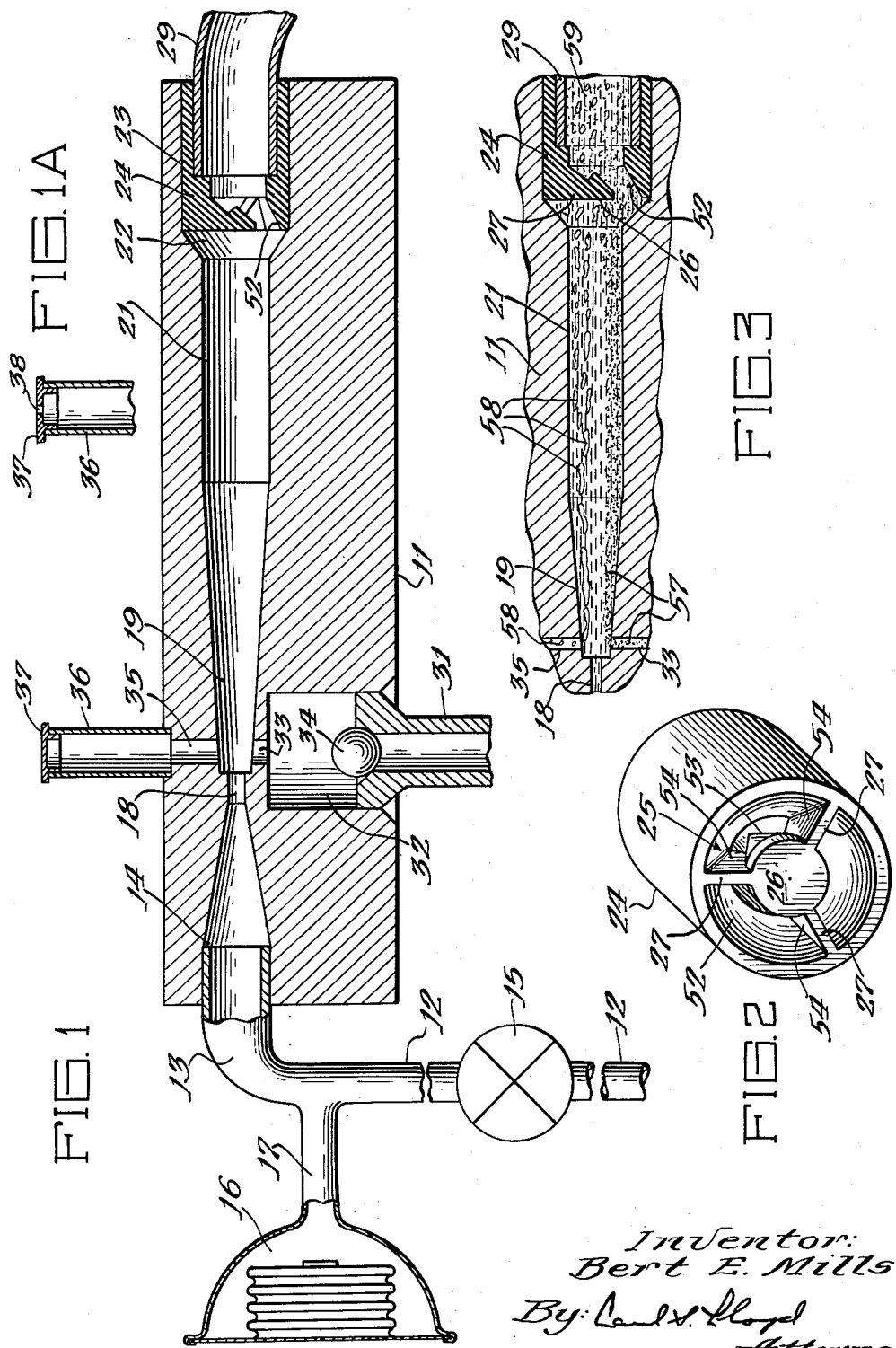
Inventor:
Bert E. Mills
By Carl N. Lloyd
Attorney July 25, 1961  B. E. MILLS  2,993,683
DISPENSING DEVICE FOR LIQUID PRODUCTS
Filed Feb. 6, 1956  3 Sheets-Sheet 2

Inventor:
Bert E. Mills
By: Carl N. Lloyd
Attorney:

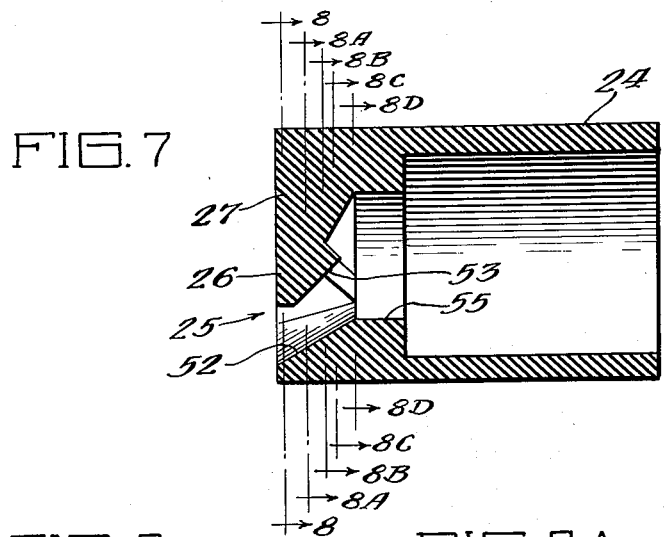
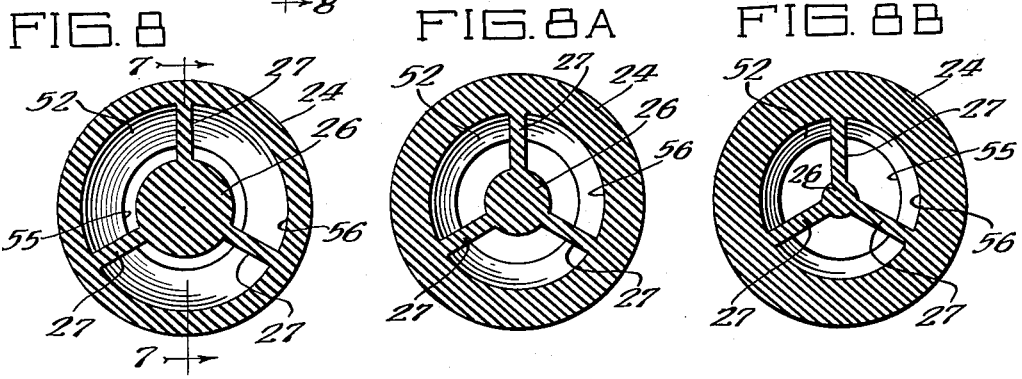
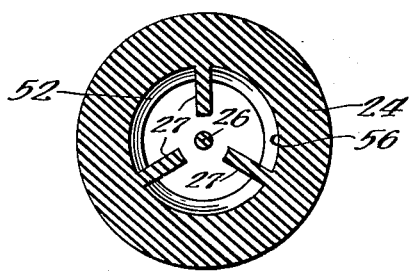
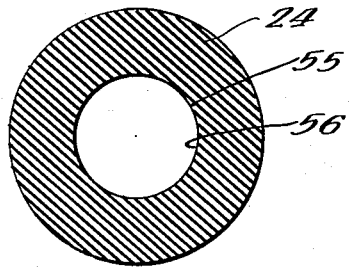

United States Patent Office 2,993,683
Patented July 25, 1961

2,993,683
DISPENSING DEVICE FOR LIQUID PRODUCTS
Bert E. Mills, St. Charles, Ill., assignor, by mesne assignments, to The Seeburg Corporation, Chicago, Ill., a corporation of Pennsylvania
Filed Feb. 6, 1956, Ser. No. 563,562
10 Claims. (Cl. 261—18)

This invention relates to a device for use in vending machines for dispensing liquid food or beverage products of the type in which a plurality of liquids (ordinarily two) are to be mixed in the dispensing operation, with or without the introduction of air or other gas.

The primary object of the invention is to provide a device of this character which will effectively draw, proportion and control the flow of the fluids and will ultimately mix them in the course of their travel to a discharge spout from which the mixed product is delivered to a cup or other receptacle.

A further object of the invention is to provide such a device in which aeration or gasification of the product, if it is of a nature in which this is desirable, may be effected as a part of the dispensing operation. This may be for the purpose of giving a product such as hot chocolate or orange juice a pleasing appearance, by forming a foamy head thereon, and improving its texture and palatability; or, in the case of a corbonated product, for the purpose of introducing carbon dioxide as the liquids are drawn through the device.

Another object of the invention is to provide in a device of this nature means by which the concentration of the mixture may be controlled by terminating the flow of the concentrate or other basic ingredient while continuing for a time the flow of the water or other diluent. This may be accomplished in a suction-type feed device of the kind hereinafter described by admission of sufficient air to the suction or vacuum chamber to terminate the drawing of the concentrate or other basic ingredient before cutting off the flow of the other liquid (usually water) through the device.

A still further object is to provide, independently of the last-mentioned means, as by the use of a bellows mechanism, for an afterflow of water through the device (after the water inlet valve has closed) to clean the principal passages and chambers thereof between successive vending operations.

Other objects and advantages of the invention will be evident from the following description of a preferred embodiment thereof, taken in connection with the accompanying drawings, in which:

FIG. 1 is a longitudinal sectional and elevational view of a device of the type to which the invention relates;

FIG. 1A is a detail view of a fragment of the cap member shown in FIG. 1, modified to show a minute bleed hole in the top thereof whereby it may be used as an aerator;

FIG. 2 is a prespective view of bushing and baffle member used in the mixing chamber of the device;

FIG. 3 is a more or less diagrammatic view of the central part of the device showing roughly how two liquids and a gas, such as air, are intermixed in the form of the device constructed to provide for aeration of the product;

FIG. 7 is a longitudinal sectional view of the bushing and mixing baffle which is shown in perspective in FIG. 2; and FIGS. 8, 8A, 8B, 8C, and 8D are sectional views taken, respectively, on the section lines indicated by corresponding members and letters in FIG. 7.

Figure 6:
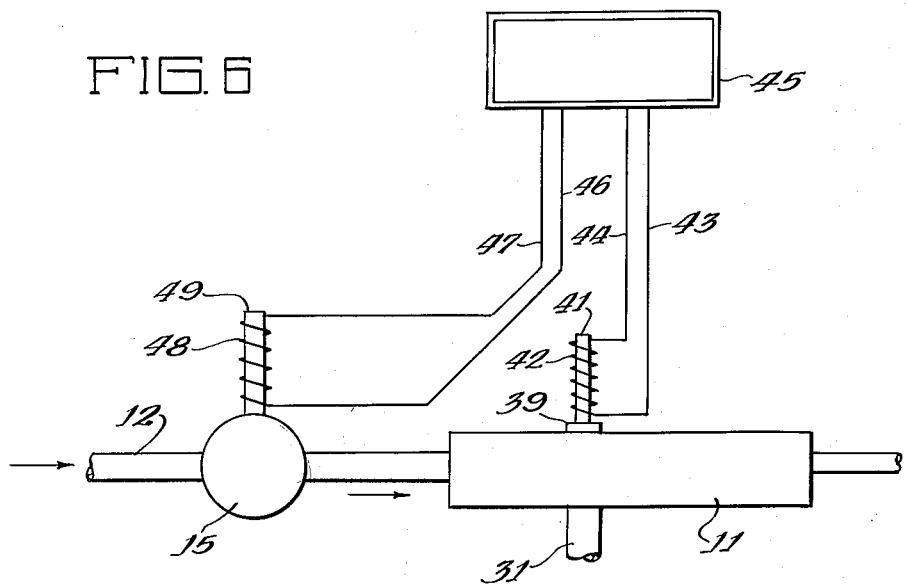
FIG. 6 is a view of the structure shown in FIG. 4, together with the water inlet valve, a control therefor and a timing unit, shown diagrammatically.

As thus illustrated, my dispensing device comprises a block 11, preferably made of metal such as stainless steel, having a series of passages and chambers therein in the general nature of a Venturi tube, with intake openings and conduits communicating therewith, as will be hereinafter more fully described. While said block as shown is of rectangular cross section, it may be referred to as a tube since the various passages and chambers therein extend longitudinally therethrough so that it forms a part of a pipe line for flow of the liquid and, if desired, gaseous media.

Said tube 11 is connected with a water supply pipe 12 by an elbow 13 which extends into a forwardly and inwardly tapered water intake passage 14 which is in the shape of a truncated cone. A water shut-off valve 15 is provided in the pipe 12 and, while shown only diagrammatically, this valve, in an automatic vending machine, would normally be arranged for automatic operation by mechanism which may be coin-controlled if desired, such mechanism not being shown except for a diagrammatic showing of the valve operating or control element in FIG. 6.

A bellows 16 of conventional construction is in open communication with the pipe 12 through a stem 17 connecting with said pipe on the side of the valve 15 toward the dispensing device.

The water inlet passage 14 leads to a restricted passage or Venturi throat 18 which in turn leads into a forwardly extending and outwardly flared passage 19 which, like the passage 14 although oppositely tapered, is in the form of a truncated cone, the left hand or entrance portion of said passage 19 serving as a suction chamber and the passage as a whole serving to change the high velocity-low pressure stream (under relative vacuum) to a higher pressure-lower velocity stream, in accordance with well known physical laws.

A forward uniform-diameter passage 21 connects the conical passage 19 with a sharply outwardly-flared chamber 22, beyond which is an enlarged bore 23 in which a combined bushing and baffle-forming member 24 is positioned. This member is preferably made of such material as neoprene and has a baffle structure 25 integrally formed therein or otherwise applied thereto.

Said baffle structure, in the form shown, comprises a central portion 26 and three radial arms or spokes 27. The inner end of the bushing 24 is inwardly beveled or chamfered, as indicated at 52, and the baffle elements 26 and 27 which extend some distance into the bushing, are also tapered inwardly, the inward taper of the baffle elements being at a more pronounced rate than that of the inner end of the bushing such that the cross-sectional area of the baffle passages will be substantially constant, for reasons which will be explained hereinafter. This structure will be hereinafter more specifically described.

A discharge spout 29 fits within the bushing 24 and extends outwardly and downwardly therefrom to deliver the mixed product to a positioned cup or other receptacle.

A product intake line 31 leads from a source of supply to a chamber 32 in the block 11 and a passage 33 leads from said chamber 32 to the suction chamber 19. A ball check valve 34 is provided to close the line 31 against back-flow.

An air intake passage 35 extends laterally through the block 11 opposite the passage 33 and, as shown in FIG. 1, a closure structure, comprising a tube 36 (which may be made of stainless steel or like material) and a plastic cap 37, surmounts said passage 35, said structure being tightly but removably set in the block 11 in any suitable manner. As shown in FIG. 1 the cap 37 is imperforate but as shown in FIG. 1A it may have a tiny bleed hole 38 therein so that a very small amount of air will constantly pass therethrough and through the tube 36 and passage 35 into the suction chamber 19 to provide for aeration of the product as will later be described.

Figure 4:
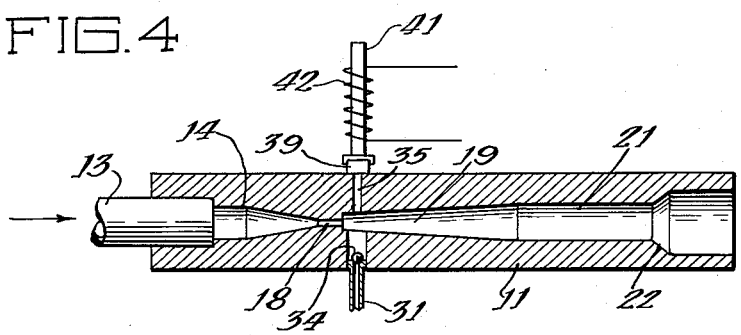
FIG. 4 is a view of the basic structure shown in FIG. 1 with the addition of a diagrammatic showing of means provided by the invention for admitting air to the vacuum chamber at a predetermined point in the cycle of operation to control the concentration of the mixture, as hereinafter explained.
Figure 5:
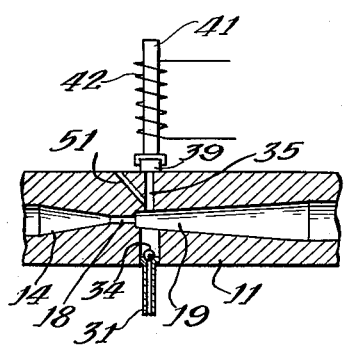
FIG. 5 is a detail view of a segment of the structure shown in FIG. 4, modified to show a bleed hole therein, as may be provided when the device is to be used for vending products in which aeration is desired.

When the product to be dispensed is of such a nature that aeration thereof is not desired an imperforate cap 37 will be used but there is nevertheless an advantage in providing the passage 35 and the closure structure 36, 37 since by removing the latter access may be had to the interior of the central part of the device to facilitate cleaning of the suction chamber and adjacent areas by a brush or scraping tool; also by such removal the vacuum in the chamber 19 may be released and drawing of the concentrate thus terminated while the water continues to flow, as will be explained in connection with the description of the structure shown in FIGS. 4–6.

Referring now more specifically to said FIGS. 4–6, it will be noted that the passage 35 is normally closed by a pad 39 on a plunger 41 on which there is an electrical coil 42, the device being thus in the nature of a solenoid actuator or control.

As shown in FIG. 6, the coil 42 is connected by leads 43 and 44 to a timing unit 45 from which leads 46 and 47 extend to a coil 48 on a solenoid plunger 49 provided for actuating the water valve 15.

The details of the structure for mounting the solenoids and the specific elements of the timing unit are not shown since such structure is conventional and will be understood by those skilled in the art from the diagrammatic showing of FIGS. 4–6. It will be evident therefrom that the water flow will be controlled by the solenoid-operated valve 15 and that, with water flowing, the operation will be as follows:

To draw concentrate or other basic ingredient into and through the nozzle the plunger 41 will be dropped to close the passage 35 so the flow of water under pressure will create a low pressure or partial vacuum in the suction chamber 19 to draw in the concentrate. For a time the water and concentrate will flow together. To stop the flow of concentrate the plunger 41 will be raised, thus admitting sufficient air to the suction chamber to break or relieve the vacuum. The water will continue to flow for a time (until the valve is closed by the solenoid 48, 49), thus lowering the concentration of the product in the cup or receptacle. In this manner intermittent flow of a water-concentrate mixture and plain water is provided for and by adjusting the timing the concentration can be determined as desired.

As previously indicated a bleed hole, which is shown at 51 in FIG. 5, may or may not be used in particular adaptations of the device depending on whether aeration is or is not desired in the product to be vended. In any event, the amount of air admitted through this hole, when provided, is so small as not to affect the drawing of the concentrate, and this optional feature is thus quite independent of the function of the solenoid valve 39, 41, 42.

Reverting to the construction of the baffle member 24, attention is called particularly to FIGS. 2, 3 and 7–8D. It will be noted that the inner or entrance end of the bushing is beveled or chamfered as shown at 52, as mentioned above, and that the central portion 26 and spokes 27 of the baffle structure on this end of the bushing extend some distance into the bore of the bushing and are tapered as indicated at 53 and 54, respectively. The passages between the beveled portion 52 of the bushing and the surfaces 53 and 54 of the baffle structure lead to a reduced bore section 55 in the bushing and the construction is such that, as shown in FIGS. 7–8D, the cross sectional area of such passages, the outer walls of which taper inwardly as indicated by the reducing circles 56, remains substantially constant throughout at least the major part of the length of such passages as the fluid passes downstream through the sections indicated by the section lines in FIG. 7. This causes the flow to be substantially constant without undue back pressure and it has been found that a substantially constant rate of flow at the baffle is highly desirable in achieving successful results with the apparatus described herein.

FIG. 3 shows roughly the action in the suction chamber when the device is constructed to provide for aeration of the product to be dispensed. As the water flows through the throat 18 and the suction chamber 19, it draws in the concentrate through the passage 33 and the concentrate, which is indicated by stippling at 57, while mixing to some extent with the water, remains most heavily in the lower part of the suction chamber until the stream strikes the baffle structure 25. The air, indicated by bubbles 58, comes in through the passage 35, and remains principally in the upper part of the suction chamber until the stream strikes the baffle. There is then sufficient turbulence to cause a thorough intermingling of the water, concentrate and air in the forward end of the mixing chamber 21 and in the entrance portion of the bushing. The intermixed and aerated product, indicated at 59, then passes out through the discharge spout 29 and into the positioned cup or other receptacle (not shown).

The function of the bellows 16 shown in FIG. 1 is to give an after-flow at a very low pressure to clean out the device with plain water. When the valve 15 opens, the expansible element of the bellows is compressed by the water under line pressure. The water at such pressure passes through the passage 14, the throat 18, the chamber 19, etc. The constriction in the throat 18 and expansion in the chamber 19 creates a low pressure area in the left-hand or entrance portion of the latter chamber which draws the concentrate in through the line 31 and carries it downstream through the passage 21, chamber 22, bushing 24 and spout 29. When the valve 15 is closed the water pressure in the chamber of the bellows 16 and in the elbow 13, passage 14, etc. drops, allowing the water which was in the bellows chamber to escape under bellows pressure, which is determined by the spring rate of the expansible element so as to be relatively low, and to pass downstream through the device. Since it is under low pressure it does not create sufficient suction in the chamber 19 to draw up concentrate through the line 31, the flow of such concentrate having been terminated upon the closing of the valve 15 and consequent reduction of the water pressure, as will be readily understood. The after-flow of clear water under the low bellows pressure cleans the passages 14, 18, 19, etc. of any residue from the concentrate, and the device is thus kept clean by this after-flow, which occurs as the final part of each vending operation.

As previously indicated, the device can be constructed with or without a bleed hole such as that indicated at 38 in FIG. 1A and at 51 in FIG. 5, depending on whether the product to be vended is one in which aeration is desirable. For example, in the case of such products as soup or coffee, aeration does not improve the appearance or palatability of the product and therefore a device without an aerating bleed hole would be employed. However, in the case of chocolate (hot or cold), orange juice and certain other products aeration is definitely desirable, and even in the case of milk some aeration, so long as it does not reduce the butter-fat content in a given volume of the milk below that required, may be beneficial; therefore, a device with an aerating bleed hole would normally be employed when the product to be vended is of this type.

It is also contemplated that in some instances the devices may be used in multiple sets. For example, in the case of plain or chocolate milk, two or more of the devices may be used. When plain milk is desired one device may vend concentrated milk and the other may have the port 35 thereof open so that only water will flow. The water mixes with the milk, thus giving a finished product of desired concentration. When chocolate milk is desired, the port 35 may be closed in both devices so the same amount of water will pass through both devices, one giving the same amount of milk as in the previous example and the other giving chocolate (which may be aerated if a bleed hole such as 51 in FIG. 5 is used) in addition to a constant amount of water. In this case the final product is changed only by the addition of the chocolate concentrate, since the same amount of water will be used in both cases. Thus a constant product will be drawn, with or without the addition of chocolate concentrate.

It will be understood that the vending machines in which the devices are used may be arranged to provide predetermined selectivity in the choice of products; also that the same principle may be applied to the vending of other products as described above with reference to milk and chocolate milk. Other examples are coffee or tea, with or without the addition of cream; orangeade, with or without the addition of lemon flavoring; etc.

The device may also be used if desired for dispensing carbonated products, in which case carbon dioxide instead of air may be admitted through the bleed hole; and it will be evident that this hole could be opened and closed to control the admission of such a gas by use of a solenoid-actuated closure member of the same kind as that shown in FIGS. 4–6 for controlling the opening and closing of the port 35, if this should be desired.

It will of course be evident that various changes and modifications in the above-described illustrative embodiments of my invention may be made within the scope of the appended claims.

I claim:

1. A dispensing device for vending liquid beverage products, comprising: a tube having a venturi-type passage extending therethrough, said passage being formed to provide therein a throat and a suction chamber; a water intake communicating with said passage at the rear of said throat; a product intake communicating with said suction chamber at an angle to the direction of flow of the stream therein; a mixing chamber at the forward end of said suction chamber; a mixing baffle member disposed in said mixing chamber and having restricted passages for the fluid stream, the inner peripheral wall of the entrance portion of said member being beveled inwardly toward the center of the member to provide the outer walls of said passages and said member having a central structure connected at spaced points to said peripheral wall and formed to provide the inner walls of said passages, said inner walls being beveled inwardly toward the center of said member throughout at least the major portion of their length and being so spaced from said outer walls as to cause said passages to be of substantially uniform cross section throughout at least the major portion of their length, the baffle member thus formed being adapted to cause sufficient turbulence in the liquid to thoroughly intermix the water and product components thereof; and a discharge spout for delivering the liquid mixture from said mixing chamber.

2. A dispensing device for vending liquid beverage products, comprising: a tube having a Venturi-type passage extending therethrough, said passage being formed to provide therein a throat and a suction chamber; a water intake communicating with said passage at the rear of said throat; a product intake communicating with said suction chamber at an angle to the direction of flow of the stream therein; a mixing chamber at the forward end of said suction chamber; a combined bushing and mixing baffle element disposed in said mixing chamber and providing partial obstruction of the flow of the fluid stream through the device, the bushing part of said element having an inwardly beveled or chamfered forward portion and the baffle part of said element comprising a structure including an enlarged central portion and radial arms or spokes extending therefrom to points of connection with the bushing, said central portion extending some distance into the bushing and being formed with outer surfaces which are beveled inwardly throughout at least the major portion of their length, such surfaces being so spaced from said beveled portion of said bushing as to form restricted passages for the liquid which are of substantially uniform cross section throughout at least the major portion of their length, the element thus formed being adapted to cause sufficient turbulence in the liquid to thoroughly intermix the water and product components thereof and a discharge spout for delivering the liquid mixture from said mixing chamber.

3. In a suction-type device for mixing and dispensing liquid beverage products composed of a plurality of liquids: means providing a suction chamber and a mixing chamber; a mixing baffle member disposed in said mixing chamber and having restricted passages for the fluid stream, the inner peripheral wall of the entrance portion of said member being beveled inwardly toward the center of the member to provide the outer walls of said passages and said member having a central structure connected at spaced points to said peripheral wall and formed to provide the inner walls of said passages, said inner walls being beveled inwardly toward the center of said member throughout at least the major portion of their length and being so spaced from said outer walls as to cause said passages to be of substantially uniform cross section throughout at least the major portion of their length, the baffle member thus formed being adapted to cause sufficient turbulence in the liquid to thoroughly intermix the components thereof; and a discharge spout for delivering the liquid mixture from said mixing chamber.

4. A dispensing device for vending liquid beverage products, comprising: a tube having a Venturi-type passage extending therethrough, said passage being formed to provide therein a throat and a suction chamber; a first-liquid intake communicating with said passage at the rear of said throat, said intake having a shut-off valve therein; a second-liquid intake communicating with said suction chamber at an angle to the direction of flow of the stream therein; a discharge spout communicably connected with said suction chamber; and means for controlling the concentration of the liquid product, said means comprising a normally-closed air passage leading into said suction chamber from the exterior of the device and of sufficient dimension to introduce an amount of air into said suction chamber which will terminate the suction by which the second liquid is drawn into said chamber, a closure for said air passage operable to open or close the same whereby, through the opening thereof, the flow of said second liquid through the device may be terminated while the flow of the first liquid is continued so as to reduce the concentration of the liquid product; timing means for controlling the opening and closing of said closure.

5. A dispensing device for vending liquid beverage products, comprising: a tube having a Venturi-type passage extending therethrough, said passage being formed to provide therein a throat and a suction chamber; a first-liquid intake communicating with said passage at the rear of said throat, said intake having a shut-off valve therein; a second-liquid intake communicating with said suction chamber at an angle to the direction of flow of the stream therein; a discharge spout communicably connected with said suction chamber; and means for controlling the concentration of the liquid product, said means comprising an air passage leading into said suction chamber from the exterior of the device and of sufficient dimension to introduce an amount of air into said suction chamber which will terminate the suction by which the second liquid is drawn into said chamber, a closure for said air passage operable to open or close the same whereby, through the opening thereof, the flow of said second liquid through the device may be terminated while the flow of the first liquid is continued so as to reduce the concentration of the liquid product, an electrical control for said closure, an electrical control for said shut-off valve, and a timing unit interconnected with said controls for regulating the same in manner to cause opening of said air passage a predetermined appreciable time before the closing of said shut-off valve.

6. A dispensing device for vending liquid beverage products, comprising: a tube having a Venturi-type passage extending therethrough, said passage being formed to provide therein a throat and a suction chamber; a water inlet chamber communicating with said passage at the rear of said throat; a water supply line communicably connected with said water inlet passage; a shut-off valve in said supply line; a bellows connected with said supply line between said valve and said water inlet passage; a product intake communicating with said suction chamber at an angle to the direction of flow of the stream therein; and a discharge spout communicably connected with said suction chamber for delivering the liquid mixture therefrom; said bellows providing a reduced pressure on the water in the device after the closing of said inlet valve which is insufficient to provide the suction necessary to draw liquid through said product intake but sufficient to cause an afterflow of water through the device to flush the same after each operation thereof.

7. A dispensing device for vending liquid beverage products, comprising: a tube having a Venturi-type passage extending therethrough, said passage being formed to provide therein a throat and a suction chamber; a first-liquid intake communicating with said passage at the rear of said throat, said intake having a shut-off valve therein; a second-liquid intake communicating with said suction chamber at an angle to the direction of flow of the stream therein; an air intake communicating with said suction chamber comprising a bleed hole in said tube of such size as to admit sufficient air to said passage for aeration of the product but not enough to overcome the effective negative pressure or vacuum in said suction chamber; a discharge spout communicably connected with said suction chamber; and means for controlling the concentration of the liquid product, said means comprising a second air intake passage leading into said suction chamber from the exterior of the device and of sufficient dimension to introduce an amount of air into said suction chamber which will terminate the suction by which the second liquid is drawn into said chamber, a closure for said second air intake passage operable to open or close the same whereby, through the opening thereof, the flow of said second liquid through the device may be terminated while the flow of the first liquid is continued so as to reduce the concentration of the liquid product, and timing means for controlling the opening and closing of said closure.

8. A dispensing device for vending liquid beverage products, comprising: a tube having a Venturi-type passage extending therethrough, said passage being formed to provide therein a throat and a suction chamber; a first-liquid intake communicating with said passage at the rear of said throat; a second-liquid intake communicating with said suction chamber at an angle to the direction of flow of the stream therein; an air intake communicating with said suction chamber also at an angle to said direction of flow, said air intake comprising a minute bleed hole adapted to admit sufficient air to said passage for aeration of the product but not enough to overcome the effective negative pressure or vacuum in said suction chamber; a mixing chamber at the forward end of said suction chamber; a mixing baffle disposed in said mixing chamber and providing partial obstruction of the flow of the fluid stream through the device, thereby causing intimate intermixture of the liquids and aeration thereof as a result of the turbulence caused by such partial obstruction of the stream; said baffle comprising an elongated tubular member with a thickened entrance portion having restricted passages for the fluid stream, said passages extending diagonally inwardly through said entrance portion of the baffle toward the center thereof and being of substantially uniform cross section throughout at least the major portion of their length; and a discharge spout for delivering the aerated liquid mixture from said mixing chamber.

9. A dispensing device for vending liquid beverage products, comprising: a tube having a Venturi-type passage extending therethrough, said passage being formed to provide therein a throat and a suction chamber; a first-liquid intake communicating with said passage at the rear of said throat, said intake having a shut-off valve therein; a second-liquid intake communicating with said suction chamber at an angle to the direction of flow of the stream therein; an air intake communicating with said suction chamber comprising a bleed hole in said tube of such size as to admit sufficient air to said passage for aeration of the product but not enough to overcome the effective negative pressure or vacuum in said suction chamber; a mixing baffle disposed in said mixing chamber and providing partial obstruction of the flow of the fluid stream through the device but without substantial back pressure, thereby causing intimate intermixture of the liquids and aeration thereof as a result of the turbulence caused by such partial obstruction of the stream; a discharge spout communicably connected with said suction chamber; and means for controlling the concentration of the liquid product, said means comprising a second air intake passage leading into said suction chamber from the exterior of the device and of sufficient dimension to introduce an amount of air into said suction chamber which will terminate the suction by which the second liquid is drawn into said chamber, a closure for said second air intake passage operable to open or close the same whereby, through the opening thereof, the flow of said second liquid through the device may be terminated while the flow of the first liquid is continued so as to reduce the concentration of the liquid product, and timing means for controlling the opening and closing of said closure.

10. A dispensing device for vending liquid products, comprising: a tube having a Venturi-type passage extending therethrough, said passage being formed to provide therein a throat and a suction chamber; a first-liquid intake communicating with said passage at the rear of said throat, said intake having a shut-off valve therein; a second-liquid intake communicating with said suction chamber at an angle to the direction of flow of the stream therein; an air intake communicating with said suction chamber comprising a bleed hole in said tube of such size as to admit sufficient air to said passage for aeration of the product but not enough to overcome the effective negative pressure or vacuum in said suction chamber; a mixing baffle disposed in said mixing chamber and providing partial obstruction of the flow of the fluid stream through the device but without substantial back pressure, thereby causing intimate intermixture of the liquids and aeration thereof as a result of such partial obstruction of the stream, said baffle comprising an elongated tubular member with a thickened entrance portion having restricted passages for the fluid stream, said passages extending diagonally inwardly through said entrance portion of the baffle toward the center thereof and being of substantially uniform cross section throughout at least the major portion of their length; a discharge spout communicably connected with said suction chamber; and means for controlling the concentration of the liquid product, said means comprising a second air intake passage leading into said suction chamber from the exterior of the device and of sufficient dimension to introduce an amount of air into said suction chamber which will terminate the suction by which the second liquid is drawn into said chamber, a closure for said second air intake passage operable to open or close the same whereby, through the opening thereof, the flow of said second liquid through the device may be terminated while the flow of the first liquid is continued so as to reduce the concentration of the liquid product, and timing means for controlling the opening and closing of said closure.

References Cited in the file of this patent

UNITED STATES PATENTS

| | | |
|---|---|---|
| 1,285,192 | Hunt | Nov. 19, 1918 |
| 2,513,417 | Lindsay | July 4, 1950 |
| 2,539,344 | Carraway | Jan. 23, 1951 |
| 2,544,289 | Andrews | Mar. 6, 1951 |
| 2,571,870 | Hayes | Oct. 16, 1951 |
| 2,690,717 | Goodrie | Oct. 5, 1954 |
| 2,724,583 | Targosh et al. | Nov. 22, 1955 |
| 2,766,026 | Boyd | Oct. 9, 1956 |

FOREIGN PATENTS

| | | |
|---|---|---|
| 953,362 | France | May 23, 1949 |